United States Patent
Lundgren

(10) Patent No.: US 7,390,101 B2
(45) Date of Patent: Jun. 24, 2008

(54) OFF-AXIS TWO-MIRROR RE-IMAGING INFRARED TELESCOPE

(75) Inventor: Mark A. Lundgren, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 66 days.

(21) Appl. No.: 11/047,174

(22) Filed: Jan. 31, 2005

(65) Prior Publication Data

US 2006/0171022 A1    Aug. 3, 2006

(51) Int. Cl.
*G02B 23/02* (2006.01)
*G02B 5/10* (2006.01)

(52) U.S. Cl. .................. 359/858; 359/365; 359/399
(58) Field of Classification Search ........... 359/850, 359/857, 858, 364–366, 399
See application file for complete search history.

(56) References Cited

U.S. PATENT DOCUMENTS

| | | | |
|---|---|---|---|
| 4,101,195 A | | 7/1978 | Korsch |
| 4,226,501 A | | 10/1980 | Shafer |
| 4,265,510 A | | 5/1981 | Cook |
| 4,733,955 A | * | 3/1988 | Cook ............ 359/859 |
| 4,834,517 A | * | 5/1989 | Cook ............ 359/366 |
| 5,114,238 A | * | 5/1992 | Sigler ............ 359/399 |
| 5,144,476 A | | 9/1992 | Kebo |
| 5,153,772 A | * | 10/1992 | Kathman et al. ....... 359/364 |
| 5,287,218 A | * | 2/1994 | Chen ............ 359/365 |
| 5,550,672 A | * | 8/1996 | Cook ............ 359/365 |
| 6,674,571 B2 | | 1/2004 | Cerutti-Maori et al. |
| 6,767,103 B2 | | 7/2004 | Cook |
| 2003/0179443 A1 | * | 9/2003 | Cook ............ 359/366 |
| 2005/0180026 A1 | * | 8/2005 | Pohle ............ 359/726 |

OTHER PUBLICATIONS

Corrado Dragone; *First-Order Correction of Aberrations in Cassegrainian and Gregorian Antennas*; IEEE Transactions on Antennas and Propagation, vol. AP-31, No. 5, Sep. 1983; 12 pages, 764-775; 1983.

Shaul Hanany & Daniel P. Marrone; *Comparison of designs of off-axis Gregorian telescopes for millimeter-wave large focal-plane arrays*; Applied Optics; 5 pages, 4666-4670; Aug. 1, 2002.

(Continued)

*Primary Examiner*—Mark A. Robinson
*Assistant Examiner*—Mark Consilvio
(74) *Attorney, Agent, or Firm*—Alston & Bird LLP

(57) ABSTRACT

An infrared telescope utilizes two mirrors in an off-axis, eccentric-pupil, re-imaging configuration. To improve the image quality of traditional two mirror telescopes, the reflective surfaces of both the primary and secondary mirrors are ellipsoidal. The ellipsoidal surface of the primary mirror has a greater eccentricity than the ellipsoidal surface of the secondary mirror. The infrared light entering through the eccentric pupil strikes the ellipsoidal reflective surface of the primary mirror. The light is reflected from the primary mirror to the ellipsoidal reflective surface of the secondary mirror. An intermediate image of the object being viewed is formed between the primary and secondary mirrors. The light is reflected from the secondary mirror to an image plane. An aperture stop is located between the secondary mirror and the image plane. The image plane is typically located within a cold shield, to reduce the likelihood that stray light will reach the image plane.

10 Claims, 3 Drawing Sheets

OTHER PUBLICATIONS

L. Page, C. Jackson, C. Barnes, C. Bennett, M. Halpern, G. Hinshaw, N. Jarosik, A. Kogut, M. Limon, S. S. Meyer, D. N. Spergel, G. S. Tucker, D. T. Wilkinson, E. Wollack, E. L. Wright; *The Optical Design and Characterization of the Microwave Anisotropy Probe;* *The Astrophysical Journal, in Press;* 22 pages, 1-22; Nov. 12, 2001.

Combined Search and Examination Report of GB0601628.1 dated May 10, 2006.

* cited by examiner

OFF-AXIS TWO-MIRROR RE-IMAGING INFRARED TELESCOPE

FIELD OF THE INVENTION

The present invention relates generally to telescope systems, and more particularly, to two mirror re-imaging telescopes.

BACKGROUND OF THE INVENTION

Infrared imaging systems, such as infrared telescopes, are used in many applications where objects that emit infrared energy need to be detected. Infrared energy that is imaged by an infrared imaging system typically has a wavelength from about 1 micrometer to about 26 micrometers. Often these infrared telescopes are used in space-based applications. For example, such a telescope may be used in a global missile defense system to detect missiles for targeting purposes. Such a telescope may also be used in unmanned space vehicles, such as unmanned service vehicles, for locating and identifying objects in space.

Space-based applications have very stringent volume and weight limitations. As such, any systems used in space-based applications must be as physically compact and lightweight as possible while still meeting the performance requirements of the application. Space-based infrared telescopes must be physically compact and lightweight, while having the image quality required by the application.

Three mirror and four mirror telescopes are known to provide good image quality, but are less physically compact and weigh more than two mirror telescopes. Two mirror telescopes are known to be more physically compact and lighter-weight compared to three and four mirror telescopes, but two mirror telescopes have poorer image quality. The image quality of two mirror telescopes is often improved by the use of a corrector element, similar to a corrective eyeglass lens. However, this corrector element increases the weight of the two mirror telescope, and this increased weight is a significant drawback for space-based telescopes.

Re-imaging telescopes are one class of reflecting telescopes. A re-imaging telescope forms an intermediate image between the primary mirror and the secondary mirror. The final image is formed at the image plane. In a telescope in which it is desirable to have an aperture stop (i.e., a physical structure that defines the volume of light that reaches the image plane) near the image plane, a re-imaging configuration may be more physically compact because the light beam is less likely to walk across the mirrors in a re-imaging telescope.

One known type of re-imaging telescope is a Gregorian telescope. A Gregorian telescope typically has a parabaloidal primary mirror and an ellipsoidal secondary mirror. In a Gregorian telescope, the primary mirror is typically imaging or mapping a point at infinity (i.e., the object being viewed, such as a star) to a finite point (i.e., the intermediate image). A parabaloidal mirror has one focus at infinity and one focus at a finite point in front of the mirror, therefore the primary mirror of a Gregorian telescope would typically be parabaloidal. The secondary mirror of a Gregorian telescope is typically imaging or mapping a finite point (i.e., the intermediate image) to another finite point (i.e., the final image). An ellipsoidal mirror has two finite points of focus, therefore the secondary mirror of a Gregorian telescope would typically be ellipsoidal. The user of an astronomical telescope is typically interested in having a better image quality at the center of the field of view. A Gregorian with a parabaloidal primary mirror gives a re-imaging telescope a better image quality at the center of the field of view and a poorer image quality at the edges of the field of view. Some users of space-based telescopes, particularly those used in a global missile defense system to detect missiles for targeting purposes, are typically interested in imaging a wider field of view than that of astronomical telescopes, in order to increase the likelihood that the telescope will locate missiles for targeting.

Some re-imaging telescopes use an off-axis, eccentric-pupil configuration. An eccentric-pupil telescope uses an entrance pupil (i.e., where light enters the telescope) that is physically offset from the optical axis. Light entering the telescope through the eccentric pupil would strike only the portion of a standard annular primary mirror that is similarly offset from the optical axis. Therefore, an eccentric-pupil telescope is constructed using only a portion of a standard annular primary mirror to conserve weight and reduce costs. Further, such an optical system is un-obscured which makes stray light easier to control. An off-axis telescope views the reflected image on an area of the image plane that is slightly offset from the optical axis. The amount of this offset will typically vary depending on the specific requirements of the telescope.

The off-axis, eccentric-pupil configuration used in some re-imaging telescopes provides several benefits. Stray light is easier to control due to this configuration. The eccentric pupil means there is no hole in the middle of the telescope optics (i.e., the telescope is un-obscured). This in turn means that there is no hole in the middle of the light beam within the telescope. This generally makes stray light easier to control because the telescope designer need not try to block that portion of the light beam having the hole. Additionally, this configuration allows for more physical space for a focal plane and cooler. A telescope will typically have a focal plane located at the image plane. The focal plane is typically an electronic device which receives and processes the image. The focal plane of a telescope is typically surrounded by a cold shield which blocks light other than the light directly reflected by the mirror closest to the focal plane from reaching the focal plane. To increase the ability of an infrared telescope to perceive infrared light, the telescope may have a cooler to cool the focal plane relative to the other structures of the telescope. Some infrared telescopes, however, may use an uncooled focal plane. Having an eccentric pupil allows the telescope designer to eliminate the unused part of the primary mirror. Being off-axis tends to move the image plane down, away from the remaining piece of the primary mirror. The resulting effect of these two conditions is that there is more physical space for the focal plane, the mounting structure, and the cooler adjacent to the remaining piece of the primary (i.e., in the physical space that would otherwise be occupied by the unused part of the primary mirror). If the eccentric-pupil, off-axis configuration were not used, the focal plane, mounting structure, and cooler would typically be located behind the primary mirror and/or in the hole that would exist in the center of the primary mirror. Finally, this configuration typically reduces aberrations, thus resulting in improved image quality.

Even in light of the existing telescope designs, there is a need for an improved telescope, such as an off-axis, eccentric-pupil two mirror infrared telescope, for space-based applications that provides adequate image quality over a relatively wide field of view in a lightweight and physically compact structure.

BRIEF SUMMARY OF THE INVENTION

An infrared re-imaging telescope is therefore provided that utilizes two mirrors in an off-axis, eccentric-pupil, re-imaging configuration. By only requiring two mirror surfaces, the weight of the telescope is advantageously reduced and the telescope can be more physically compact in comparison to three- or four-mirror configurations. To overcome the poorer image quality of traditional two mirror telescopes, the reflective surfaces of both the primary mirror and the secondary mirror are ellipsoidal, thereby providing adequate image quality over a relatively wide field of view.

According to one embodiment of the present invention, the telescope includes an eccentric pupil through which infrared light enters the telescope. The eccentric pupil is offset from the optical axis. The telescope also includes a primary mirror having an ellipsoidal reflective surface for reflecting infrared light. The telescope also includes a secondary mirror having an ellipsoidal reflective surface for receiving infrared light reflected by the primary mirror after formation of an intermediate image and for further reflecting the infrared light. The telescope also includes an image plane for receiving the infrared light reflected by the secondary mirror.

In one embodiment of the present invention, the ellipsoidal surface of the primary mirror has a greater eccentricity than that of the ellipsoidal surface of the secondary mirror. For example, in one embodiment of the invention, the eccentricity of the primary mirror is between −0.80 and −0.95, and is preferably −0.93. In this embodiment, the eccentricity of the secondary mirror is between −0.20 and −0.35, and is preferably −0.32. In another embodiment, a ratio of the eccentricity of the ellipsoidal surface of the primary mirror to the eccentricity of the ellipsoidal surface of the secondary mirror is between 2:1 and 4:1.

In one embodiment of the present invention, the telescope may further include a structure defining an aperture stop that is disposed between the secondary mirror and the image plane. This aperture stop may be generally circular in shape, it may be generally rectangular in shape, or it may be generally trapezoidal in shape. In this embodiment, light is reflected from the secondary mirror to the image plane through this aperture stop, but light that strikes the structure forming the stop does not reach the image plane. As a result, only light reflecting from an area of the secondary mirror which corresponds to the shape of the aperture stop reaches the image plane. Similarly, only light reflecting from an area of the primary mirror which corresponds to the shape of the aperture stop reaches the image plane. One purpose of this aperture stop is to prevent light which is reflected from the outer perimeters of the mirrors, which are more likely to have optical distortions, from reaching the image plane. An overall purpose of the aperture stop is to change the volume of light reaching the image plane. In the embodiments in which the aperture stop is generally rectangular, the ratio of the length of the sides of the aperture stop along the radial axis to the length of the sides along the tangential axis is approximately 2:3, thereby blocking light from a larger radial portion of the primary mirror and reducing aberrations associated with the perimeter of the primary mirror.

In one embodiment of the invention, the telescope has a ratio of a length of the telescope to a diameter of a primary aperture of approximately 3:1. In another embodiment of the invention, the telescope has a field of view of between 0.7 and 1.5 degree, and preferably 1 degree. In another embodiment of the invention, the telescope has a focal ratio of 3 or greater.

In another embodiment of the invention, the center of the field of view is off-axis by between 0.08 and 0.12, degree, and preferably by 0.1 degree.

As such, the present invention provides a telescope that is light-weight and has a physically compact structure, at least in comparison to three- and four-mirror configurations. The telescope may therefore be utilized for space-based applications that demand light weight and physical compactness. Moreover, the inventive telescope may have an improved image quality over a relatively wide field of view compared to a typical two-mirror telescope.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
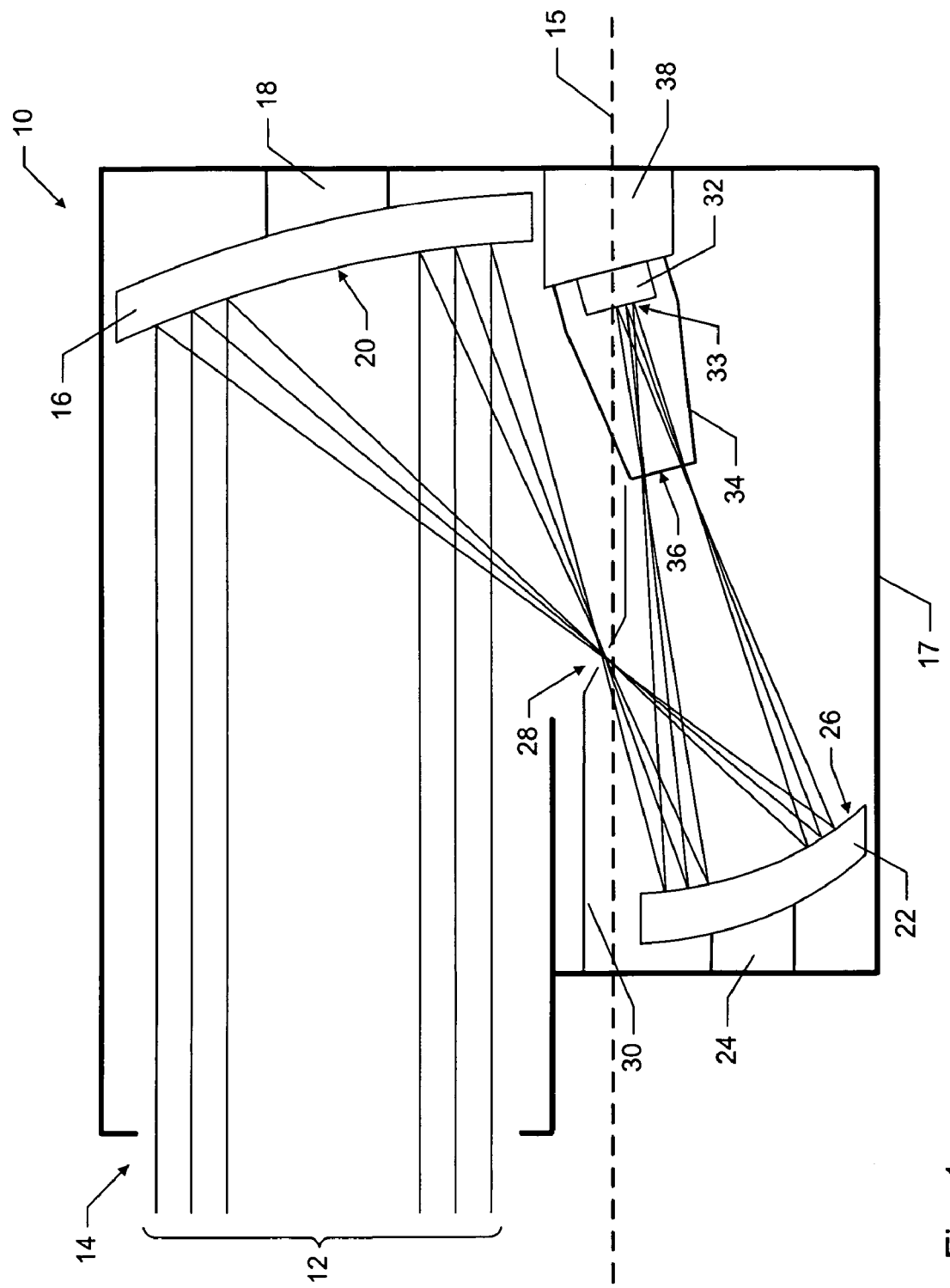
FIG. 1 is a side elevation schematic of an infrared telescope, in accordance with one embodiment of the present invention.

FIG. 1 is a side elevation schematic of an infrared telescope, in accordance with one embodiment of the present invention. As shown in FIG. 1, infrared light in the form of beam path 12 enters telescope 10 through eccentric pupil 14. As discussed above, pupil 14 is eccentric since the pupil is offset from the optical axis 15, which is shown as a dashed line in FIG. 1. As discussed above, an off-axis telescope views the reflected image on an area of the image plane that is slightly offset from the optical axis. In the telescope of the present invention, this offset is approximately 0.1 degrees. Referring again to FIG. 1, the telescope includes a primary mirror 16 that is mounted to the telescope housing 17 via primary mirror mount 18. Primary mirror 16 is positioned such that light entering the telescope strikes the primary mirror and, in particular, an ellipsoidal surface 20 of the primary mirror.

The telescope 10 also includes a secondary mirror 22 and a field stop 30 defining an opening positioned between the primary and secondary mirrors for preventing stray light (i.e., light not in beam path 12) from impinging upon the secondary mirror. The infrared light reflected from ellipsoidal surface 20 of primary mirror 16 passes through the opening in field stop 30 to secondary mirror 22. Intermediate image 28 is formed as beam path 12 is reflected from primary mirror 16 to secondary mirror 22. Note that field stop 30 is trimming or cropping intermediate image 28. Secondary mirror 22 is typically mounted to telescope housing 17 via secondary mirror mount 24.

The secondary mirror 22 also includes an ellipsoidal surface 26 to reflect the infrared light to image plane 33. Focal plane 32 receives and processes the image at image plane 33. Focal plane 32 is positioned within cold shield 34, such that cold shield 34 blocks stray light from reaching focal plane 32. The cold shield 34 defines an opening 36 (termed an aperture stop) that faces the secondary mirror through which the infrared light enters cold shield 34 and impinges upon focal plane 32. Opening 36 controls the beam of light that is imaged on the focal plane 32. It should be appreciated that opening 36 could be formed by an independent structure rather than by cold shield 34. It should also be appreciated that, in some embodiments, a cold shield may not be used. A structure such as a baffle may be used instead of a cold shield.

Focal plane 32 and cold shield 34 are typically mounted to telescope 10 via focal plane mounting assembly 38. In addition to providing structural support for focal plane 32 and cold shield 34, focal plane mounting assembly 38 would typically include a cooler to cool focal plane 32 relative to the other structures of telescope 10. Focal plane mounting assembly 38 would also typically include the electrical connections between focal plane 32 and the external environment, such as an avionics system of a space vehicle within which telescope 10 is mounted.

The telescope of the present invention would typically have a length to primary aperture ratio of approximately 3:1. The telescope of the present invention would also typically have a field of view of approximately 1 degree, and a focal ratio of approximately 3 or greater, preferably 3.3. The telescope may be formed of beryllium, aluminum, or silicon carbide, it may be formed of electroformed nickel, or it may be formed of any other suitable optical material.

In one exemplary embodiment of the telescope of the present invention, the primary mirror has a radius of 278.61 mm, an eccentricity of −0.93, an aperture of 170 by 120 mm, and is 70 mm off-axis. In this exemplary embodiment, the secondary mirror is 202.28 mm from the vertex of the primary mirror, has a radius of 94.84 mm, an eccentricity of −0.32, an aperture of 84 by 64 mm, and is 28 mm off-axis. The exemplary embodiment has an aperture stop 125.12 mm from the vertex of the secondary mirror. The aperture stop forms a trapezoidal aperture with a short side measuring 22 mm, a long side measuring 26 mm, and angled sides measuring 15 mm. The aperture stop is 10.53 mm below the optical axis. This exemplary embodiment forms a final image at an image plane that is 67.02 mm from the aperture stop. The telescope of the exemplary embodiment has a field of view of 1.4 by 1.4 degrees, with an offset of −0.1 degrees, and an effective focal number of approximately 3.3.

It should be appreciated that the infrared re-imaging telescope of the present invention comprises only two mirrors with power and no more than two mirrors with power. However, the telescope may incorporate a flat folding mirror in some embodiments, or it may incorporate a flat scanning mirror in front of the telescope.

Figure 2:
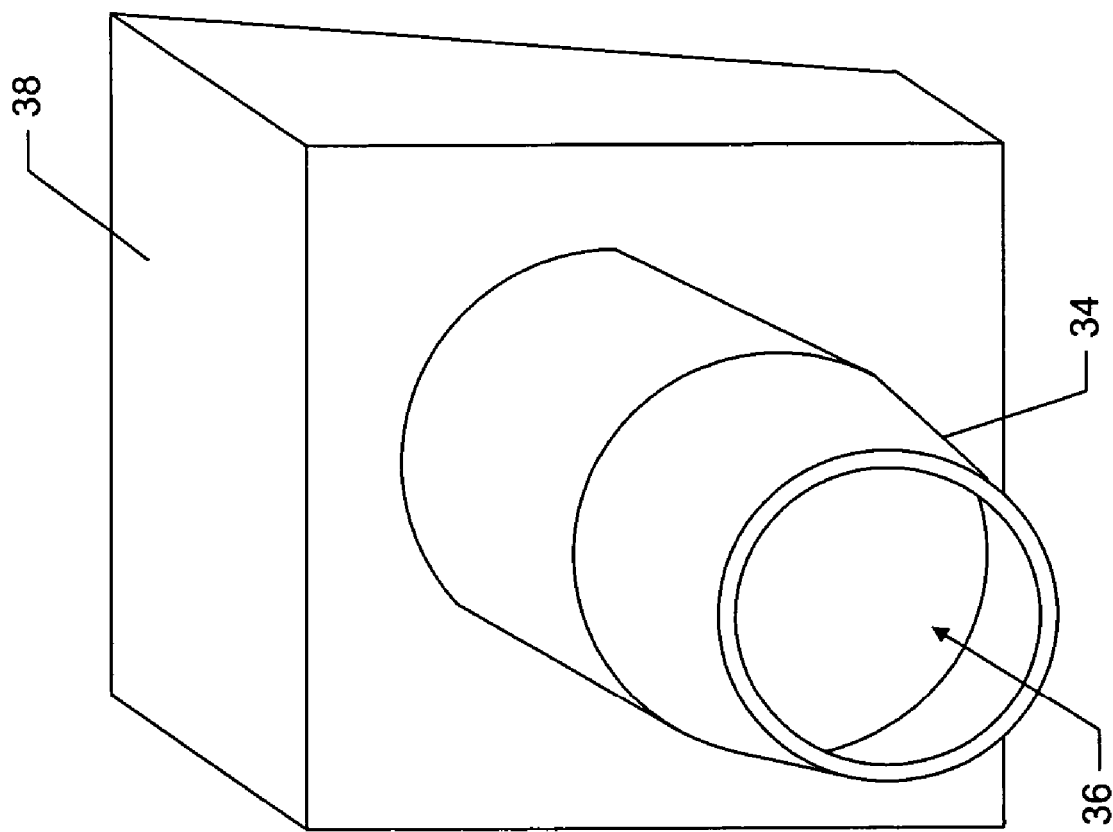
FIG. 2 is a perspective view of a cold shield of an infrared telescope, in accordance with one embodiment of the present invention.

FIG. 2 is a perspective view of a cold shield of an infrared telescope, in accordance with one embodiment of the present invention. FIG. 2 illustrates cold shield 34 mounted to focal plane mounting assembly 38. In this embodiment, opening 36 encompasses the full diameter of that end of cold shield 34 that faces secondary mirror 22, such that opening 36 forms an aperture stop. A cold shield with an integral aperture stop is illustrated in U.S. Pat. No. 6,024,458 to Lundgren.

Figure 4:
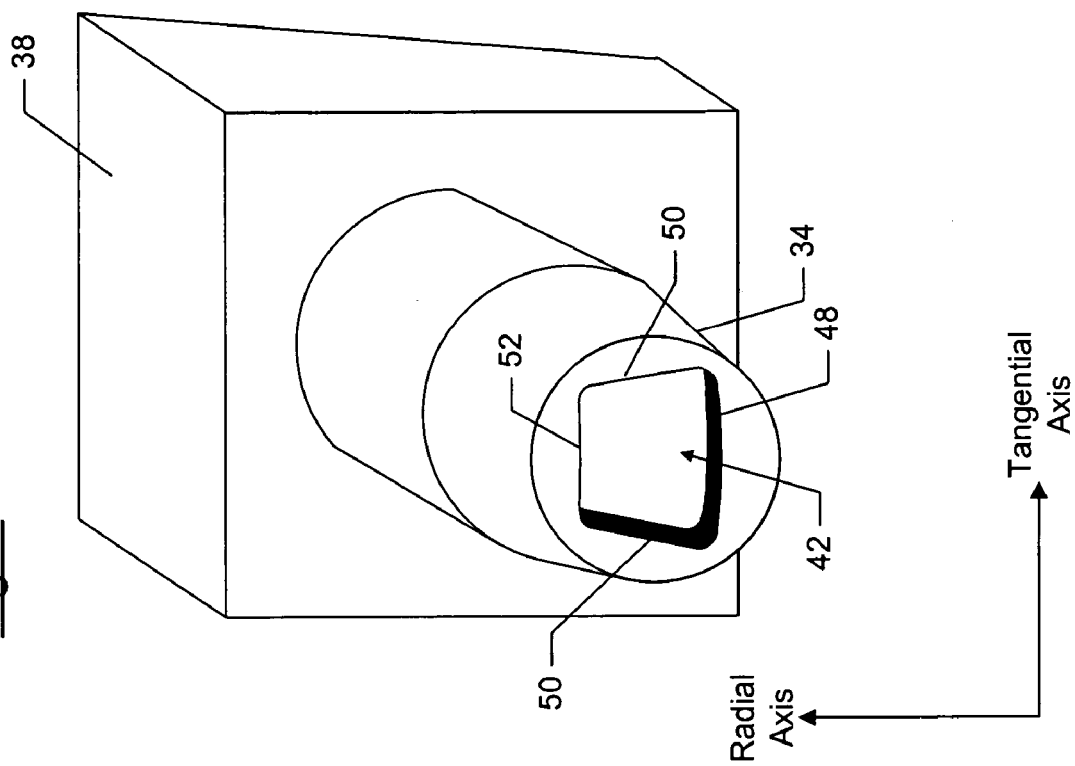
FIG. 4 is a perspective view of a cold shield and associated aperture stop of an infrared telescope, in accordance with another embodiment of the present invention.
Figure 3:
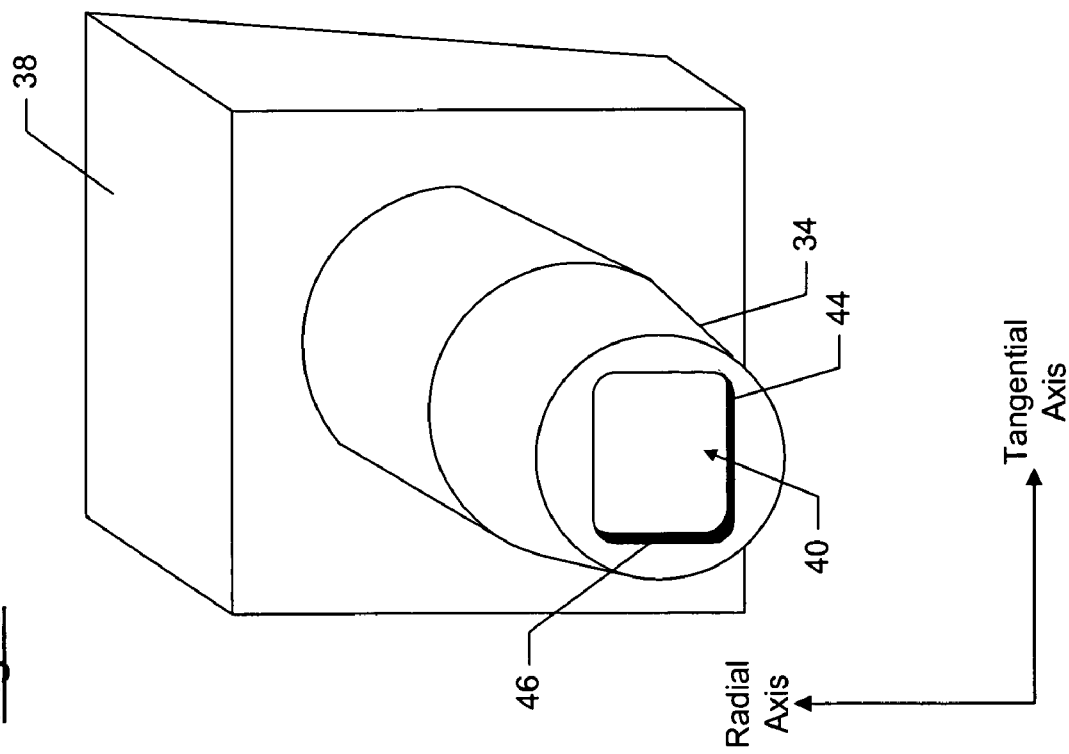
FIG. 3 is a perspective view of a cold shield and associated aperture stop of an infrared telescope, in accordance with one embodiment of the present invention.

Alternatively, the end of the cold shield that defines the opening could define a smaller opening, such as by having a centrally extending annular flange, so as to narrow the incoming light that reaches focal plane 32. This annular flange would thereby form a smaller aperture stop than is formed by opening 36 in FIG. 2. The annular flange could form an aperture stop in one of many different shapes, such as round, square, rectangular, or trapezoidal, depending on the requirements of the telescope. In this regard, FIGS. 3 and 4 are perspective views of cold shields of an infrared telescope, in accordance with two additional embodiments of the present invention. In FIGS. 3 and 4, the end of cold shield 34 that faces secondary mirror 22 includes an additional structure to define a smaller aperture stop. The aperture stop restricts a portion of beam path 12 from reaching focal plane 32. The portion of beam path 12 that is able to reach focal plane 32 corresponds to the shape of the stop. As discussed above, the purpose of this aperture stop is to prevent light which is reflected from the outer perimeter of the mirrors from reaching the focal plane. The outer perimeter of the mirrors is more prone to causing aberrations. As such, the aperture stop defined by the end of the cold shield advantageously blocks light from this potentially distorted area of the mirrors. The orientation of the aperture stop defined by the end of the cold shield relative to a radial axis and a tangential axis of the primary mirror is illustrated in FIGS. 3 and 4.

In the embodiment illustrated in FIG. 3, aperture stop 40 has a generally rectangular shape. The longer side 44 of the rectangular aperture stop is generally oriented along the illustrated tangential axis of the primary mirror, and as such may be called the tangential side. The shorter side 46 of the rectangular aperture stop is generally oriented along the illustrated radial axis of the primary mirror, and as such may be called the radial side. In the illustrated embodiment, the ratio of the length of the shorter side 46 to the length of the longer side 44 is about 2:3. As such, more light is blocked along the radial axis than along the tangential axis, thereby blocking more light from the potentially distorted outer perimeter of the mirrors. It should be appreciated that the ratio of the length of the shorter side to the length of the longer side may vary, typically from 1:1 to 1:2. As the shorter side decreases in size relative to the longer side, more light is blocked along the radial axis but the image quality may decrease due to diffraction.

In the embodiment illustrated in FIG. 4, aperture stop 42 has a shape that is generally trapezoidal with rounded corners. The opposed longer side 48 and shorter side 52 are generally oriented along the illustrated tangential axis of the primary mirror, and as such may be called the tangential sides. The angled sides 50 are generally oriented along the illustrated radial axis of the primary mirror, and as such may be called the radial sides. In the illustrated embodiment, the ratio of the length of the angled sides 50 to the length of the longer side 48 is about 2:3, although this ratio may also vary. As such, more light is blocked along the radial axis than along the tangential axis, thereby blocking more light from the potentially distorted outer perimeter of the mirrors. As mentioned above, it should be appreciated that the aperture stop may have any one of several different shapes depending on the specific technical requirements of the telescope.

As described above, the reflective surfaces of both the primary and secondary mirrors are ellipsoidal. This is a departure from a typical Gregorian astronomical telescope which has a parabaloidal primary mirror. The parabaloidal primary mirror of the typical Gregorian telescope generally gives a better image quality at the center of the field of view and a poorer image quality at the edges of the field of view. In the telescope of the present invention, using an ellipsoidal primary instead of a parabaloidal primary may worsen the image quality in the center of the field of view and may improve the image quality at the edges of the field of view, as compared to a typical Gregorian telescope. Therefore, the telescope of the present invention advantageously has a wider field of view than a typical Gregorian telescope with an image quality that is adequate for infrared imaging. This wider field of view increases the likelihood that the telescope will locate missiles for targeting.

The ellipsoidal surfaces of the primary and secondary mirrors may be defined by the eccentricity of the ellipsoidal surfaces. Eccentricity is a measure of how much a surface deviates from spherical, with a sphere having an eccentricity of 0 and a parabaloid having an eccentricity of −1. In the telescope of the present invention, the primary mirror has an eccentricity closer to that of a parabaloid, while the secondary mirror has an eccentricity closer to that of a sphere. In one embodiment of the invention, the eccentricity of the primary mirror is between −0.80 and −0.95, and is preferably −0.93. In this embodiment, the eccentricity of the secondary mirror is between −0.20 and −0.35, and is preferably −0.32. As such, the ratio of the eccentricity of the primary mirror to that of the eccentricity of the secondary mirror is approximately 3:1. Having a primary mirror eccentricity of about −0.93 and a secondary mirror eccentricity of about −0.32 provides the desired wide field of view with adequate image quality for infrared imaging.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An off-axis, eccentric-pupil infrared telescope comprising:
   a primary mirror having an ellipsoidal reflective surface for reflecting infrared light;
   a secondary mirror having an ellipsoidal reflective surface for receiving infrared light reflected by the primary mirror after formation of an intermediate image and for further reflecting the infrared light; and
   an image plane for receiving the infrared light reflected by the secondary mirror,
   wherein the telescope is configured such that the primary and secondary mirrors are the only mirrors with power that reflect the infrared light that is received by the telescope prior to receipt of the infrared light by the image plane, and
   wherein an eccentricity of the ellipsoidal surface of the primary mirror is greater than an eccentricity of the ellipsoidal surface of the secondary mirror.

2. The telescope of claim 1, further comprising a structure defining an aperture stop disposed between the secondary mirror and the image plane.

3. The telescope of claim 2, wherein the aperture stop has a shape that is generally rectangular.

4. The telescope of claim 3, wherein a ratio of a length of a shorter side of the aperture stop to a length of a longer side of the stop is 2:3.

5. The telescope of claim 2, wherein the aperture stop has a shape that is generally trapezoidal.

6. The telescope of claim 5, wherein a ratio of a length of an angled side of the aperture stop to a length of a longest side of the pupil is 2:3.

7. The telescope of claim 1, wherein the telescope has a ratio of a length of the telescope to a diameter of a primary aperture of 3:1.

8. The telescope of claim 1, wherein the telescope has a field of view of between 0.7 and 1.5 degrees.

9. The telescope of claim 1, wherein the telescope has a focal ratio of 3 or greater.

10. The telescope of claim 1, wherein an angle between an axis of rotation of the primary and secondary mirrors and the center of the field of view is 0.1 degree.

* * * * *